(12) United States Patent
Recktenwald et al.

(10) Patent No.: US 7,289,875 B2
(45) Date of Patent: Oct. 30, 2007

(54) SYSTEMS AND METHODS FOR SWAY CONTROL

(75) Inventors: Alois Recktenwald, Herzogenaurach (DE); Wolfgang Wichner, Wendelstein (DE); Farshid Arman, Lafayette, CA (US)

(73) Assignees: Siemens Technology-To-Business Center LLC, Berkeley, CA (US); Siemens Aktiengesellschaft, Munich (DE)

( * ) Notice: Subject to any disclaimer, the term of this patent is extended or adjusted under 35 U.S.C. 154(b) by 478 days.

(21) Appl. No.: 10/869,150

(22) Filed: Jun. 15, 2004

(65) Prior Publication Data

US 2005/0103738 A1 May 19, 2005

Related U.S. Application Data

(60) Provisional application No. 60/520,518, filed on Nov. 14, 2003.

(51) Int. Cl.
*G06F 7/00* (2006.01)

(52) U.S. Cl. .................. 700/213; 212/272; 212/273

(58) Field of Classification Search ............. 700/213; 212/273, 272, 275
See application file for complete search history.

(56) References Cited

U.S. PATENT DOCUMENTS

| | | | | |
|---|---|---|---|---|
| 4,215,851 A | | 8/1980 | Holmen | |
| 4,820,101 A | * | 4/1989 | Fenn | 414/21 |
| 5,217,126 A | * | 6/1993 | Hayashi et al. | 212/277 |
| 5,495,955 A | * | 3/1996 | Shibata | 212/275 |
| 5,526,946 A | * | 6/1996 | Overton | 212/275 |
| 5,583,776 A | | 12/1996 | Levi et al. | |
| 5,642,822 A | * | 7/1997 | Monzen et al. | 212/275 |
| 5,724,265 A | | 3/1998 | Hutchings | |
| 5,785,191 A | * | 7/1998 | Feddema et al. | 212/275 |
| 5,823,369 A | | 10/1998 | Kuromoto | |
| 5,899,963 A | | 5/1999 | Hutchings | |
| 5,960,969 A | * | 10/1999 | Habisohn | 212/275 |
| 5,961,563 A | * | 10/1999 | Overton | 701/50 |
| 6,050,429 A | * | 4/2000 | Habisohn | 212/275 |
| 6,102,221 A | * | 8/2000 | Habisohn | 212/270 |
| 6,122,960 A | | 9/2000 | Hutchings et al. | |
| 6,126,023 A | * | 10/2000 | Durrant-Whyte et al. | 212/274 |
| 6,305,221 B1 | | 10/2001 | Hutchings | |
| 6,460,711 B1 | * | 10/2002 | Kato et al. | 212/275 |
| 6,496,765 B1 | | 12/2002 | Robinett, III et al. | |
| 6,588,610 B2 | * | 7/2003 | Ong et al. | 212/275 |
| 2004/0164041 A1 | * | 8/2004 | Sawodny et al. | 212/273 |

FOREIGN PATENT DOCUMENTS

| | | |
|---|---|---|
| DE | 4238795 A1 | 7/1993 |
| EP | 0841295 A2 | 5/1998 |
| FR | 2571867 A1 | 4/1986 |
| FR | 2704847 A1 | 11/1994 |

OTHER PUBLICATIONS

Miyata, Noriaki et al. "Development of Feedforward Anti-Sway Control for Highly efficient and Safety Crane Operations", Mitsubishi Heavy Industries, Ltd., Technical Review, vol. 38, No. 2 (Jun. 2001), pp. 73-77.

(Continued)

*Primary Examiner*—Khoi H. Tran

(57) ABSTRACT

Systems, methods and computer program code for the measurement and control of sway in load transportation systems are provided which include using Micro-Electro-Mechanical Systems (MEMS) devices to measure and control the sway of suspended loads such as loads suspended from cranes.

18 Claims, 8 Drawing Sheets

OTHER PUBLICATIONS

On Load Sway Estimation and Control of Quay Cranes, Monica Louda, Australian Centre for Field Robotics School of Aerospace, Mechanical and Mechatronic Engineering, The University of Sydney, Feb. 2002, 264 pages total.

* cited by examiner

SYSTEMS AND METHODS FOR SWAY CONTROL

CROSS-REFERENCE TO RELATED APPLICATIONS

This application claims priority under 35 U.S.C. § 119(e) to U.S. Provisional Patent Application Ser. No. 60/520,518, entitled "Use of MEMS-based Devices in Anti-Sway Control of Loads in Cranes", filed in the name of Recktenwald et al. on Nov. 14, 2003, the contents of which are hereby incorporated by reference in their entirety for all purposes.

BACKGROUND

The present disclosure relates generally to the movement of loads and, more particularly, to the measurement and control of sway in load transportation systems.

Load transportation systems such as ship-to-shore cranes, tower cranes, marine-based cranes, Rail-Mounted Gantry Cranes (RMGC), and boom cranes are often used to move loads from one location to another. These loads are often large and heavy and tend to sway or swing during movement. Load sway decreases transportation efficiency and increases the risk of damage and injury.

An example of a typical load transportation system 100 is shown in FIG. 1. The system 100 may comprise, for example, a load spreader 102 suspended from a trolley 104 by one or more trolley ropes 106. For example, where the load 108 is a rectangular box container, a trolley rope 106 may support each of the four top corners of the load spreader 102 carrying the container 108.

The trolley 104 may travel along a rail 110 which may be the rail of a crane. For example, the rail 110 may be a standard "I" beam or steel "W" section and/or the load jib of a tower crane. The trolley 104 may have one or more pulleys 112 that may be used to raise or lower the load spreader 102 and any load 108 carried by the load spreader 102.

When the load 108 is transported from one location to another the load 108 may sway. In the system 100 shown in FIG. 1 the sway may be defined, for example, as the deviation of the load 108 from the position expected of the load 108 at rest. The magnitude and/or direction of sway may change, sometimes frequently, such as when the load 108 swings beneath the trolley 104. The sway may be dictated by various factors including, but not limited to, the weight and/or configuration of the load 108, the length of the trolley ropes 106, the speed and/or motion of the trolley 104, and/or various weather conditions such as prevailing winds, or wave motions affecting marine-based cranes.

The sway of the load 108 must generally be monitored and/or controlled to avoid collisions or damage to the load and/or to increase load transportation efficiency. For example, the sway may often need to be minimized to allow the crane operator to easily place the load 108 in a desired location with a high degree of precision (often measured in centimeters). Unfortunately, current methods of controlling the sway are often limited to reliance upon a skilled operator to minimize sway and efficiently transport the load 108.

Electronic systems for reducing sway (such as shown in FIG. 1) typically consist of a camera 114 mounted on the trolley 104 and a reflector 116 mounted on the load spreader 102. The camera 114 records images directly beneath the camera 114 including the position of the reflector 116. The images may then be interpreted to determine the sway of the load. Lights 118 may be used to illuminate the area beneath the camera 114 to facilitate viewing of the reflector 116. The reflector 116 may also be heated to reduce condensation and/or other weather-related effects that could inhibit visibility.

Unfortunately, such systems are often costly and inefficient, requiring expensive cameras, complicated reflector mechanisms, high-intensity lights, and taxing image interpretations (either manual or using powerful computer processors) to determine sway. Further, such costly components may often fail, contributing to increased maintenance costs of such systems.

Accordingly, there is a need for sway control that addresses these and other problems found in existing technologies.

SUMMARY

Methods, systems, and computer program code are therefore presented for controlling sway in load transportation systems.

According to some embodiments, systems, methods, and computer code are operable to receive a first signal representing an acceleration of a first object from a first device coupled to the first object, receive a second signal representing an acceleration of a second object from a second device coupled to a second object, the second object suspended from the first object, and, determine, based at least in part on the first and second signals, a sway of the second object with respect to the first object, the sway representing a relative displacement of the second object with respect to the first object.

According to some embodiments, systems, methods, and computer code are operable to receive, from a device coupled to a cable extending between a first point of a first object and a second point of a second object, the second object being suspended from the first object, a signal representing an angle of displacement of the cable, and determine a sway of the second object with respect to the first object based at least in part on the signal, the sway representing a relative displacement of the second object with respect to the first object.

With these and other advantages and features of embodiments that will become hereinafter apparent, embodiments may be more clearly understood by reference to the following detailed description, the appended claims and the drawings attached herein.

DETAILED DESCRIPTION OF SPECIFIC EMBODIMENTS

Some embodiments described herein are associated with a "sway". As used herein, the term "sway" may generally refer to a displacement, movement, distance, separation, orientation, action, and/or any other relational and/or spatial characteristic associated with one or more objects. For example, a sway may be a relative displacement of one object with respect to another object. The term "sway" may also generally refer to any number, value, variable, or any combination of identifiers and/or metrics related to a sway. For example, the sway may be or include an angular measurement that is associated with a relative displacement between two or more objects. The sway may also be referred to and/or identified as being or including a characteristic of one or more objects. In other words, the sway may be referred to as and/or associated with a velocity, acceleration, displacement, and/or any combination of characteristics related to an object.

In addition, some embodiments are associated with a "Micro-Electro-Mechanical Systems (MEMS) device" or "MEMS device". As used herein, the terms "MEMS" or "MEMS device" may be used interchangeably and may generally refer to any device that integrates electronic and mechanical components in a single device. For example, a MEMS device may be a device that integrates a mechanical sensor (such as a velocity sensor) with electronics on a common silicon substrate. The electronics may, for example, process the information from the sensor to compute acceleration or other metrics. MEMS devices may generally be small integrated devices housing microelectronics and micro-sensors. MEMS may be fabricated, for example, using micro-fabrication and/or micromachining technologies.

Figure 2:
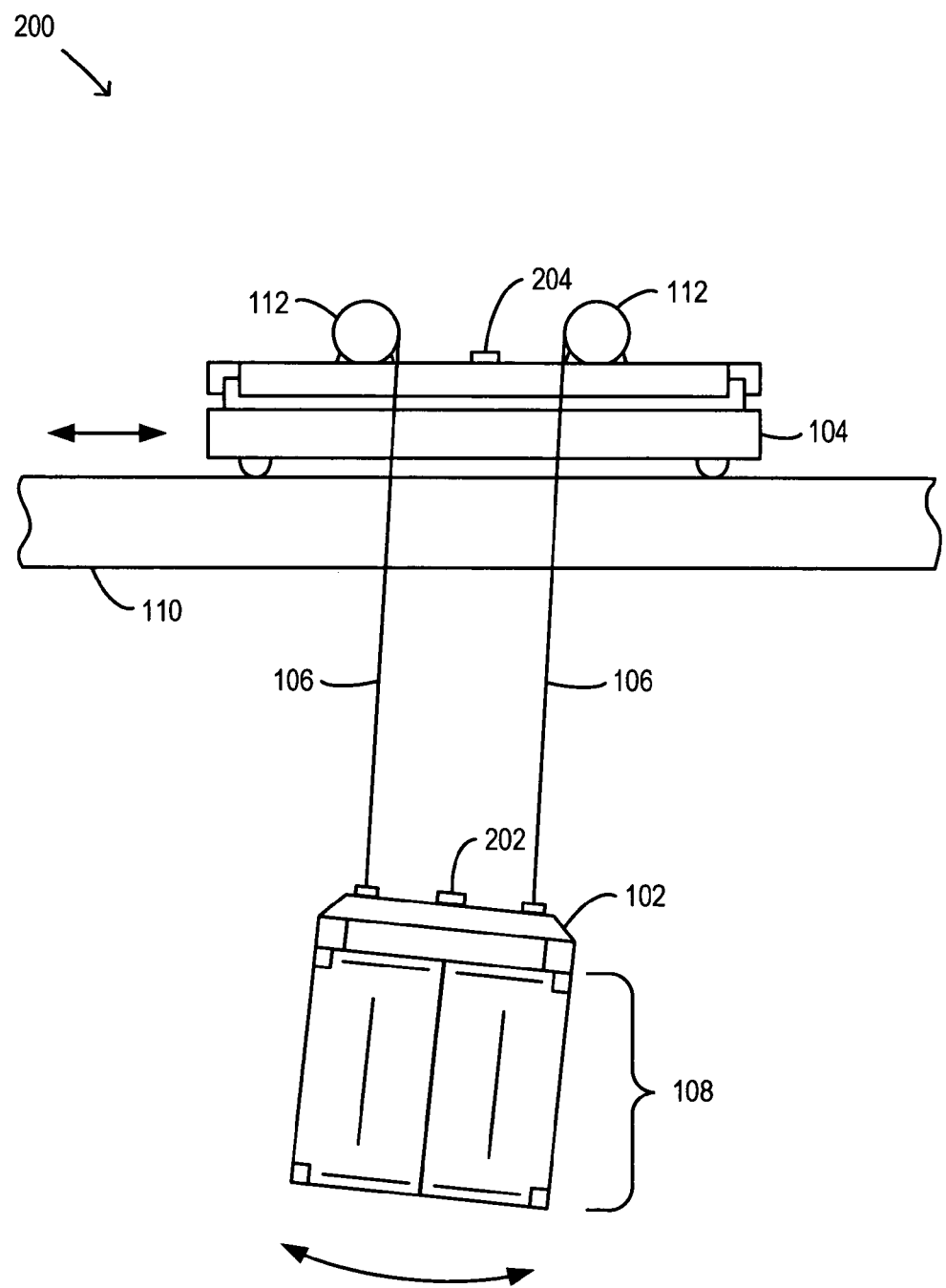
FIG. 2 is a block diagram of a system for transporting loads according to some embodiments.

Referring to FIG. 2, a block diagram of a system 200 for transporting a load according to some embodiments is depicted for use in explanation, but not limitation, of described embodiments. Different types, layouts, quantities, and/or configurations of systems may be used without deviating from some embodiments.

Figure 1:
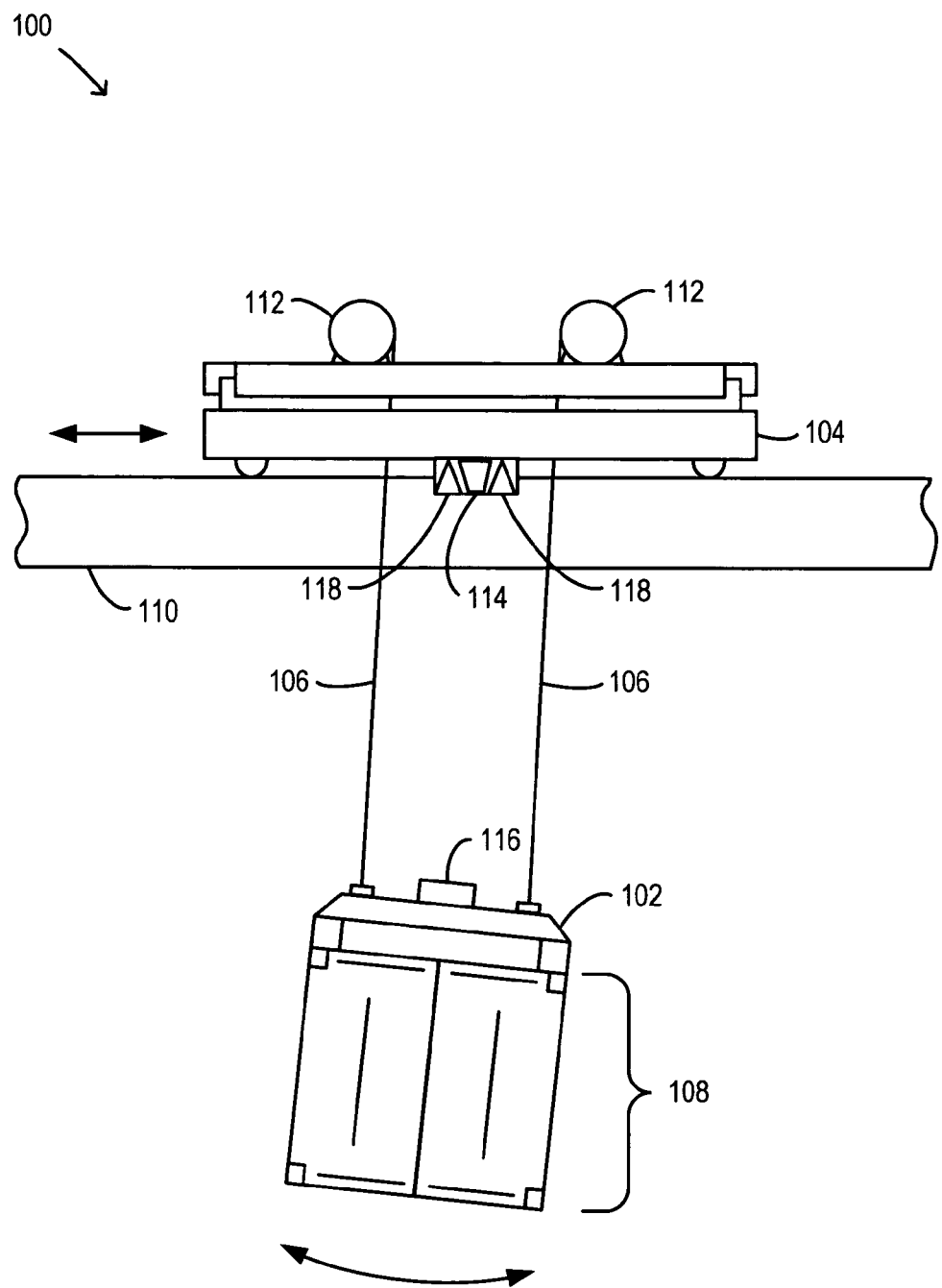
FIG. 1 is a block diagram of a prior art system for transporting loads.

In some embodiments, the system components 102, 104, 106, 108, 110, 112 may be similar in configuration and/or functionality to those described in conjunction with FIG. 1 above. In some embodiments fewer or more components than shown may be included in system 200. According to some embodiments, the system 200 may include an Inertial Measurement Unit (IMU) device 202 attached to, mounted on, and/or otherwise associated with the load spreader 102 and an IMU device 204 attached to, mounted on, and/or otherwise associated with the trolley 104. The IMU devices 202, 204 may be any type of inertial measuring devices that are or become known. IMU devices may include, for example, (i) one, two, or three accelerometers, (ii) one, two, or three gyroscopes, (iii) an analog-to-digital converter to digitize the signals of (i) and/or (ii), (iv) a processor to process the digital signals, (v) a communication method (which may or may not be wireless), and/or (vi) an optional source of power such as a battery. In some embodiments the IMU devices 202, 204 may be or include MEMS devices such as MEMS accelerometers.

The IMU device 202 on the load spreader 102 may measure, for example, the acceleration of the load spreader 102, the load 108, or the combination of the load spreader 102 and load 108. The IMU device 204 on the trolley 104 may measure the acceleration of the trolley 104, the rail 110 (such as when the crane and/or crane jib or boom are also moving), or the combination of the trolley 104 and the rail 110. According to some embodiments, the acceleration measurements may be taken relative to one or more particular axes or paths. For example, either or both accelerations may be measured along an axis defined by the rail 110. In some embodiments, the total acceleration (in three dimensions) may be measured by either or both IMU devices 202, 204.

In some embodiments, either or both of the IMU devices 202, 204 may also or alternatively measure and/or otherwise determine at least one of a yaw, a pitch, and/or a roll associated with any of the load spreader 102, the load 108, the combination of the load spreader 102 and the load 108, the trolley 104, the rail 110, and/or the trolley 104 and the rail 110 combination. As will be discussed further below, measurements from either or both of the IMU devices 202, 204 may be used to determine an amount of sway associated with the load 108.

The trolley ropes 106 may be any type or configuration of suspension devices are or become known. For example, the trolley ropes 110 may be or include rope or aluminum and/or steel cables. The load 108 may be any type of load that is or becomes known, such as a crate, box, trailer, and/or any other type of container or other object to be transported. In some configurations there may be more or fewer pulleys 112 than are shown. Also in some configurations, there may be no trolley 104 and/or rail 110. The load spreader 102 may also have various alternate configurations.

For example, a standard crawler-mounted boom crane (not shown) may suspend a load 108 from a hook on a pulley (which serves a purpose similar to that of the load spreader 102). The hook and pulley may be suspended from one or more ropes 106 that connect to a single pulley 112. The pulley 112 may be attached to the end of the crane boom, for example. In such a configuration no trolley 104 or rail 110 are needed to transport the load 108 (e.g., the whole crane is moved to transport the load 108).

Figure 3:
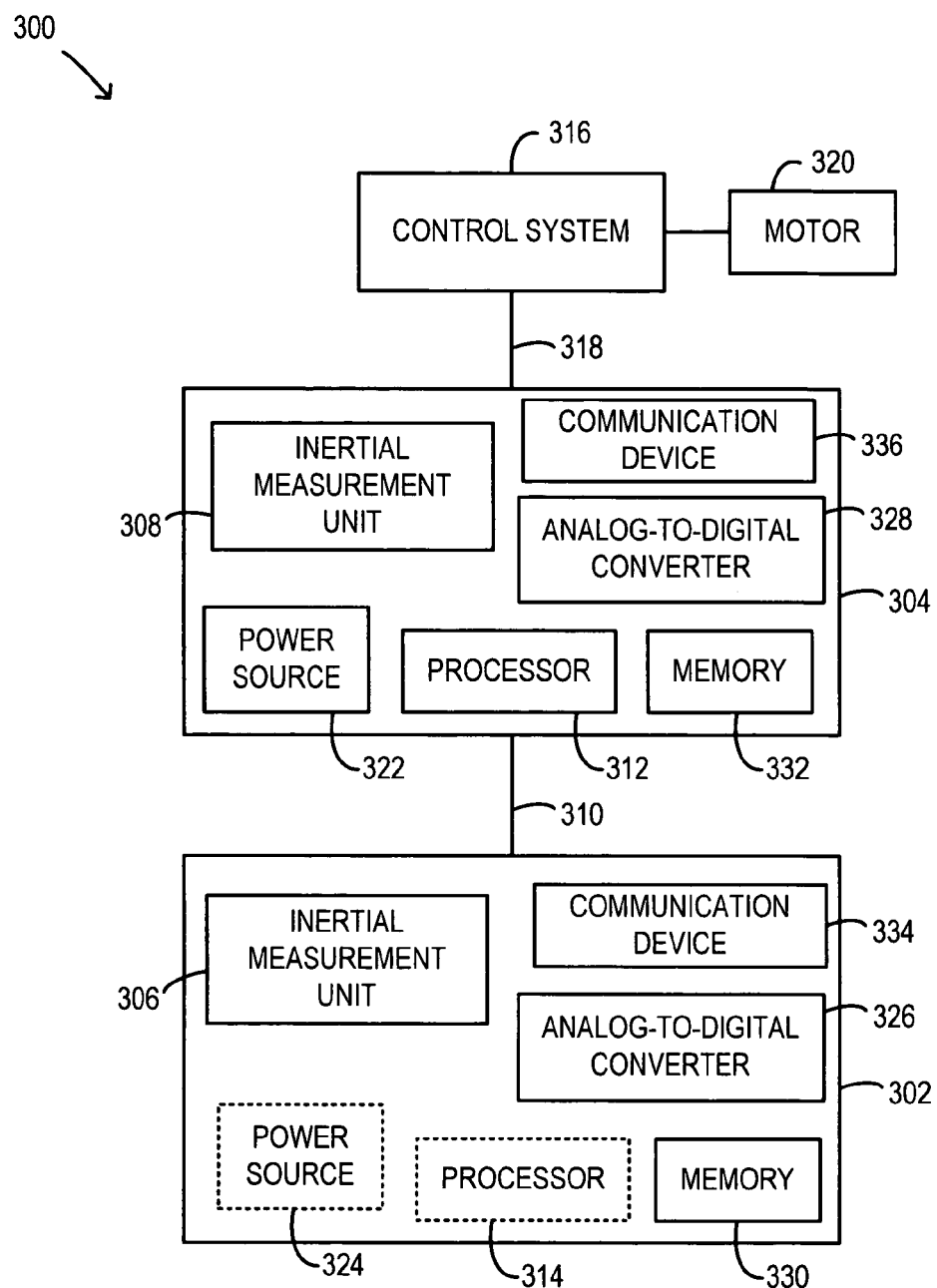
FIG. 3 is a block diagram of a system according to some embodiments.

Turning now to FIG. 3, a block diagram of a system 300 according to some embodiments is shown. The system 300 may, for example, be utilized in conjunction with and/or as part of the load transportation system 200 to measure and/or control the sway of loads. In some embodiments, system 300 may include fewer or more components than are shown in FIG. 3.

According to some embodiments, system 300 may include a first device 302 and a second device 304. In some embodiments, either or both of the first and second devices 302, 304 may be or include MEMS devices. The first and second devices 302, 304 may include, for example, IMU devices 306, 308. In some embodiments, either the first and second devices 302, 304 and/or the IMU devices 306, 308 may be similar in configuration and/or functionality to the IMU devices 202, 204 described in conjunction with FIG. 2 herein. For example, the first and second devices 302, 304 (and/or the IMU devices 306, 308) may be or include MEMS accelerometers and/or MEMS gyroscopes. In some embodiments, the first device 302 may be associated with a load and/or load spreader and the second device 304 may be associated with a crane trolley.

Either or both of the first and second devices 302, 304 may, according to some embodiments, be, include, and/or be in communication with or utilize sensors such as the IMU devices 306, 308. The first and second devices 302, 304 may include other sensors in addition to or in place of the IMU devices 306, 308. In some embodiments, the IMU devices 306, 308 (or other sensors) may be or include MEMS devices or may be components, portions, and/or electronics of and/or within MEMS devices.

For example, the first device 302 may be a MEMS device associated with a load spreader and/or a load (such as load spreader 102 and/or load 108, for example). Similarly, the second device 304 may be a MEMS device associated with a trolley (such as trolley 104). The first and second MEMS devices may measure accelerations (and/or other metrics) of their respectively associated objects (the load/load spreader and the trolley) using, for example, the IMU devices 306, 308. In some embodiments, the first MEMS device 302 may generate a signal representing the acceleration of the load and/or load spreader. The signal may then be transmitted to and/or otherwise received by the second MEMS device 304. The transmission, for example, may occur via a communications path 310 between the first and second MEMS devices 302, 304.

In some embodiments, the system 300 may include one or more processors 312, 314. The processor 312, 314 may, for example, be part of, attached to, in communication with, and/or otherwise associated with either or both of the devices 302, 304. In some embodiments, the processor 314 may be associated with the second MEMS device 304 (as shown by the dotted-box 314 in FIG. 3). The processor 312, 314 may also be separate from and in communication with the second MEMS device 304. According to some embodiments, the second MEMS device 304 (or the IMU device 308 component thereof) may, for example, transmit signals such as acceleration measurements to the processor 312, 314. The processor 312, 314 may also or alternatively receive signals and/or information such as acceleration measurements from the first MEMS device 304 (or the IMU device 306 component thereof) via, for example, communications path 310. These communications may be accomplished using any form of wired and/or wireless communication that is or becomes known.

The processor 312, 314 may, according to some embodiments, utilize the signals and/or acceleration measurements from the MEMS devices 302, 304 (and/or 306, 308) to calculate or otherwise determine a sway of a load or a sway of a load and load spreader combination. The processor 312, 314 may also utilize other information such as empirical data, and/or data from lookup, and/or database tables in determining the sway. In some embodiments the sway may then be transmitted, relayed, and/or otherwise reported to a control system 316. The processor 312, 314 may, for example, generate a sway signal representing the sway of the load and transmit the signal to the control system 316 via communications path 318. The control system 316 may then adjust the movement of the trolley (such as trolley 104) to control and/or compensate for the sway determined by the processor 312, 314.

For example, the control system 316 may control a motor 320 that is operable to move the trolley along an axis (such as along a rail and/or crane jib). The control system 316 may, according to some embodiments, receive sway signals from the processor 312, 314 and may, for example, control the motor 320 to reduce the sway of a suspended load. This adjustment process may be repeated at various intervals to reduce the amount of sway associated with a load during the transportation of the load to a destination. In some embodiments the MEMS devices 302, 304 (and/or 306, 308) and the processor 312, 314 may continuously (or substantially continuously—such as up to one hundred times per second) update the measurements and/or sway information. In some embodiments, the processor 312, 314 may send signals to either or both of the MEMS devices 302, 304 (and/or 306, 308). For example, when a load has reached a destination, the processor 312, 314 may send a signal such as a reset and/or calibration signal to the IMU device 306.

The second MEMS device 304 may, according to some embodiments, be powered by a power source 322. The power source 322 may be, for example, any type of power source that is or becomes known, such as a power transformer, a generator, and/or a battery or other power storage device. In some embodiments, the first MEMS device 302 may be supplied power by a power source 324. The power source 324 may be or include, for example, a battery or other power storage device located on and/or attached to the load spreader. In some embodiments, the first MEMS device 302 may be powered by the power source 322, which may be located, for example, on the trolley. In other words, the power source 322 may transfer power to the first MEMS device 302 via a power cable (not explicitly shown in FIG. 3) extending between the trolley and the load spreader. In some embodiments the power cable may be or include a power cable that also carries power to the load spreader. The power cable may also or alternatively be or include the communications path 310, for example.

In some embodiments the system 300 may also or alternatively include analog-to-digital converters 326, 328 and/or memory devices 330, 332. In some embodiments, for example, the IMU devices 306, 308 may produce analog signals. One or more analog-to-digital converters 326, 328 may be used to convert the analog signals to digital signals. According to some embodiments, an analog-to-digital converter 326, 328 may be used for each of the IMU devices 306, 308 to produce digital signals that may be more easily used, for example, by the processor 312, 314 to determine sway. In some embodiments either or both of the analog-to-digital converters 326, 328 may be separate from either or both of the MEMS devices 302, 304 respectively. In other embodiments (such as shown in FIG. 3), the analog-to-digital converters 326, 328 may be or include components of the MEMS devices 302, 304.

The memory devices 330, 332 may, according to some embodiments, store signals and/or information such as acceleration measurements. For example, the memory devices 330, 332 may store either or both of analog and digital acceleration measurement signals produced by either or both of the IMU devices 306, 308 and the analog-to-digital converters 326, 328. The memory devices 330, 332 may also or alternatively store other information such as empirical data, formulas, program code, lookup tables, and/or databases for use in determining the sway. In some embodiments a memory device 330, 332 may be attached and/or coupled to either or both of the MEMS devices 302, 304 (and/or 306, 308), and/or to the processor 312, 314. The memory devices 330, 332 may be any types of information storage devices that are or become known, including magnetic or optical disks and/or random access memory (RAM).

In some embodiments, the communications between and/or among the devices 302, 304 and/or the control system 316 may be facilitated, controlled, and/or otherwise managed by one or more communications devices 334, 336. The communications devices 334, 336 may, for example, be or include communications interfaces that allow the MEMS devices 302, 304 to receive and/or transmit various communications signals. In some embodiments, the communications devices 334, 336 may be coupled to, for example, the communications paths 310, 318 to facilitate transmission of acceleration and/or control data between the MEMS devices 302, 304 and/or the control system 316. According to some embodiments, either or both of the communications devices 334, 336 may be or include network interface devices such as a Network Interface Card (NIC).

Figure 4:
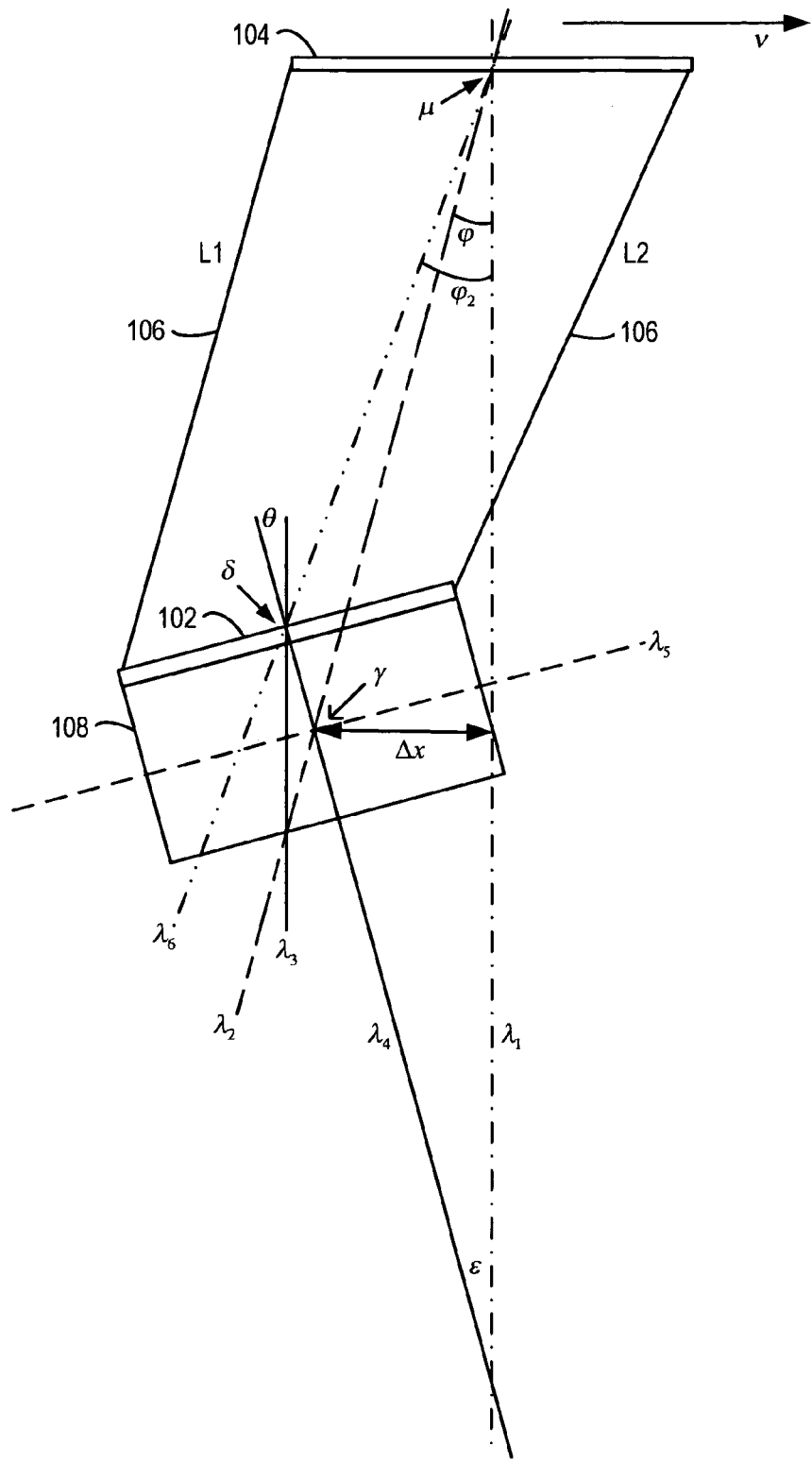
FIG. 4 is a block diagram of the geometry of the system of FIG. 2.

Turning now to FIG. 4, a block diagram of the geometry of a suspended load like that of system 200 is shown. Load 108 is shown carried by the load spreader 102. The load spreader 102 is suspended from the trolley 104 via trolley ropes 106. The trolley ropes 106 are shown as having lengths "L1" and "L2". In some embodiments, the lengths L1 and L2 are equal. According to some embodiments, there may be four (or more) trolley ropes 106 of equal length suspending the load spreader 102 and load 108 combination.

Three reference points are also shown in FIG. 4. The first reference point is identified as "$\mu$". Point $\mu$, according to some embodiments, may be the midpoint and/or the center of gravity of the trolley 104 and/or the midpoint of the pulley(s) 112. The second reference point is identified as "$\delta$". Point $\delta$ may, according to some embodiments, be the midpoint and/or center of gravity of the load spreader 102. The third reference point is identified as "$\gamma$". According to some embodiments, point $\gamma$ may be the center of gravity of the load 108 or of the combination of the load 108 and load spreader 102 (the entire suspended object). The motion and/or velocity of the trolley 104 along an axis is represented by the variable "v". The various reference lines may, according to some embodiments, be defined as follows:

$\lambda_1$ a vertical line extending downward from point $\mu$
$\lambda_2$ a line extending from point $\mu$ through point $\gamma$
$\lambda_3$ a vertical line (parallel to $\lambda_1$) extending through point $\delta$
$\lambda_4$ a line extending from point $\delta$ through point $\gamma$
$\lambda_5$ a line perpendicular to $\lambda_4$ extending through point $\gamma$
$\lambda_6$ a line extending from point $\mu$ through point $\delta$ The angle formed between the lines $\lambda_1$ and $\lambda_2$ is identified as "$\phi$". The angle "$\phi_2$" is formed by the intersection of the lines $\lambda_1$ and $\lambda_6$. The angle formed between the lines $\lambda_1$ and $\lambda_4$ is identified as "$\epsilon$". Because lines $\lambda_1$ and $\lambda_3$ are parallel, the angle formed between lines $\lambda_3$ and $\lambda_4$, which is identified as "$\theta$", is equivalent to the angle $\epsilon$. The distance "$\Delta x$" is the shortest distance between line $\lambda_1$ and point $\gamma$. The relevance of the described geometries will be apparent to those skilled in the art, particularly as utilized by embodiments as described herein.

Figure 5:
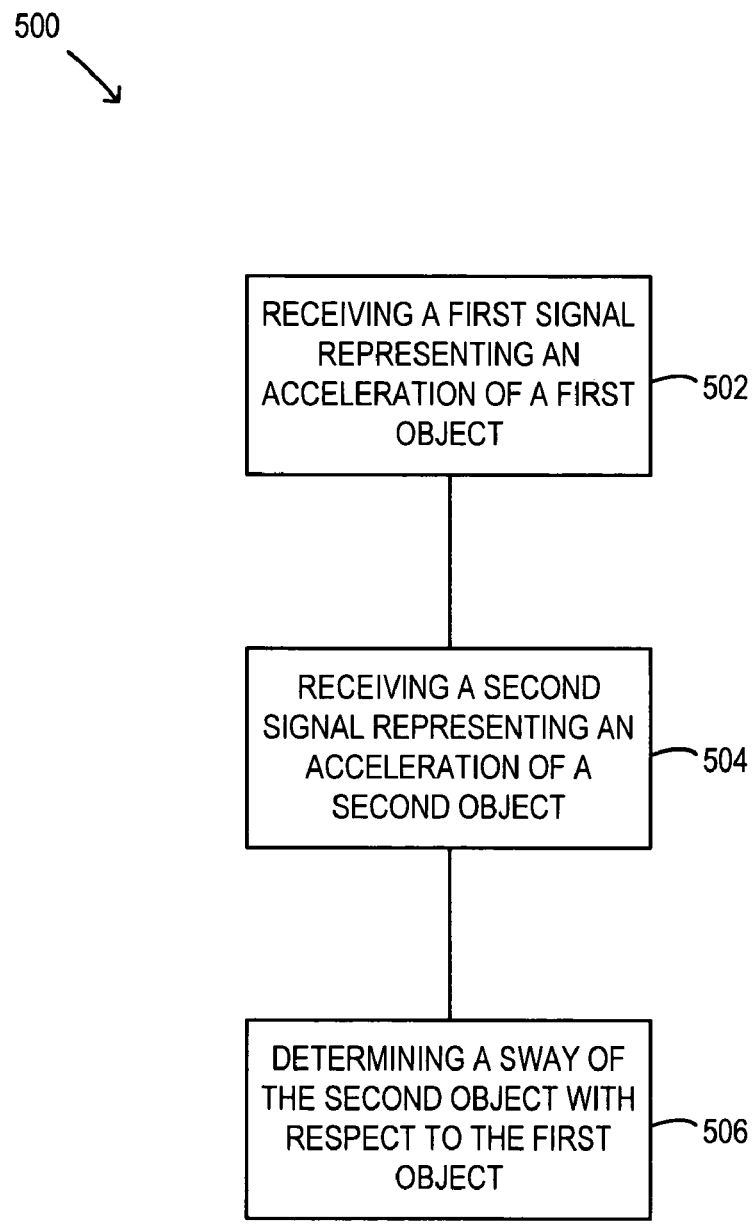
FIG. 5 is a flowchart of a method according to some embodiments.

For example, referring now to FIG. 5, a flow diagram of a method 500 for determining the sway of a load in accordance with some embodiments is shown. The method 500 may be associated with and/or performed by, for example, the systems 200 and/or 300 (or one or more of the system components) described in conjunction with any of FIG. 2 and/or FIG. 3 herein. The flow diagrams described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

In some embodiments (such as shown in FIG. 5), the method 500 may begin by receiving a first signal representing an acceleration of a first object, at 502. For example, a MEMS and/or other acceleration measuring device may be attached to and/or otherwise associated with a first object and may generate a first signal representing the acceleration (and/or other metric) of the first object. The first object may be, for example, a trolley, boom pulley, or other crane component as described in conjunction with system 200 herein. In some embodiments, the second signal may be received by one or more processors (such as the processor 312, 314 of system 300, for example).

In some embodiments the method 500 may continue by receiving a second signal representing an acceleration of a second object, at 504. In some embodiments the second object may be suspended from the first object. For example, a MEMS and/or other acceleration measuring device may be attached to and/or otherwise associated with a load spreader (or load spreader and load combination) such as described in relation to system 200 herein. The load spreader may be suspended from a crane or crane component, for example, such as a trolley or boom pulley.

According to some embodiments, the MEMS accelerometer coupled to the load spreader may generate the second signal representing the acceleration (and/or other metric) associated with the load spreader and/or load and load spreader combination. This signal may be received, for example, by one or more processors. In some embodiments the second signal may be received by the same processor that receives the first signal. The signals may, according to some embodiments, be received by separate devices and/or entities such as separate and/or multiple processors and/or computers, for example.

The method 500 may continue at 506 by determining a sway of the second object with respect to the first object. For example, a processor may utilize the first and/or second signals to determine a sway of a load (and/or load spreader) with respect to a trolley. In some embodiments, other information such as empirical data, tables, and/or formulas may also be utilized to determine the sway of the load. For illustrative purposes, an exemplary process for determining sway will be described hereinafter with reference to the geometry described in conjunction with FIG. 4 herein.

For example, a processor and/or other device may receive both first and second signals (at 502 and 504, for example). The processor may use these signals—which may contain acceleration and/or other information associated with the respective first and second objects—to calculate velocities and/or displacements of the two objects. In some embodiments, the processor may calculate the velocity and/or displacement of the point $\mu$ of a trolley. The processor may also calculate the velocity and/or displacement of the point $\gamma$ of the load, for example. The characteristics of the two points $\mu$ and $\gamma$ (such as displacements) may be compared to determine a net motion of the second object with respect to the first. In other words, for example, the net motion of a load relative to a crane trolley may be determined based on the acceleration measurements (and ultimately the displacements) of the two respective objects.

For example, the displacement of the point $\mu$ is a function of the velocity of point $\mu$ over time. Similarly, the velocity of point $\mu$ is a function of the acceleration of point $\mu$ over time. In some embodiments the acceleration of point $\mu$ may be measured, recorded, and/or otherwise determined by a MEMS device associated with point $\mu$. The displacement of point $\mu$, along an axis for example, may thus be determined based upon the acceleration of point $\mu$ over time. The displacement of the point $\gamma$ may similarly be determined based upon the acceleration of point $\gamma$ over time.

According to some embodiments, the net displacement of the point $\gamma$ may be represented by the distance $\Delta x$ defined in conjunction with FIG. 4 herein. In some embodiments the net displacement may be otherwise defined. The sway of the load may further be a function of the displacements of the two points $\mu$ and $\gamma$, for example. In some embodiments, the sway of the load may be defined as a function of the net displacement of point $\gamma$ with respect to point $\mu$. The sway may also be defined, for example, as being equivalent to the distance Δx. Those skilled in the art will recognize how the various metrics are interrelated and how such metrics and/or other metrics may be calculated and/or otherwise utilized to determine sway of a load using the methods described herein.

In some embodiments the method 500 may involve and/or include other processes. For example, the processor may generate a sway signal that is representative of the sway of the load. This sway signal, according to some embodiments, may be received by a control system (such as control system 316) that is capable of affecting the motion of the trolley along an axis (such as an axis defined by the rails the trolley may ride upon). For example, the control system may include a motor that enables the trolley to move along a rail. The control system may control the speed and/or direction of the motor to reduce the sway of the load. According to some embodiments the control system may generate a control signal indicative of an action required by the motor. In some embodiments, the motion of the trolley may be at least in part determined based upon the sway signal received from the processor.

The sway of the load may again be determined based upon new signals received from the MEMS devices, for example. This re-determination may occur at pre-defined time intervals or in any pattern and/or configuration that is or becomes known and/or practicable. In some embodiments the re-generation of acceleration signals and the re-determination of the load sway may take place several or even hundreds of times per second. The resulting control of the trolley motion by the control system may thus effectively reduce the sway of the load.

Figure 6:
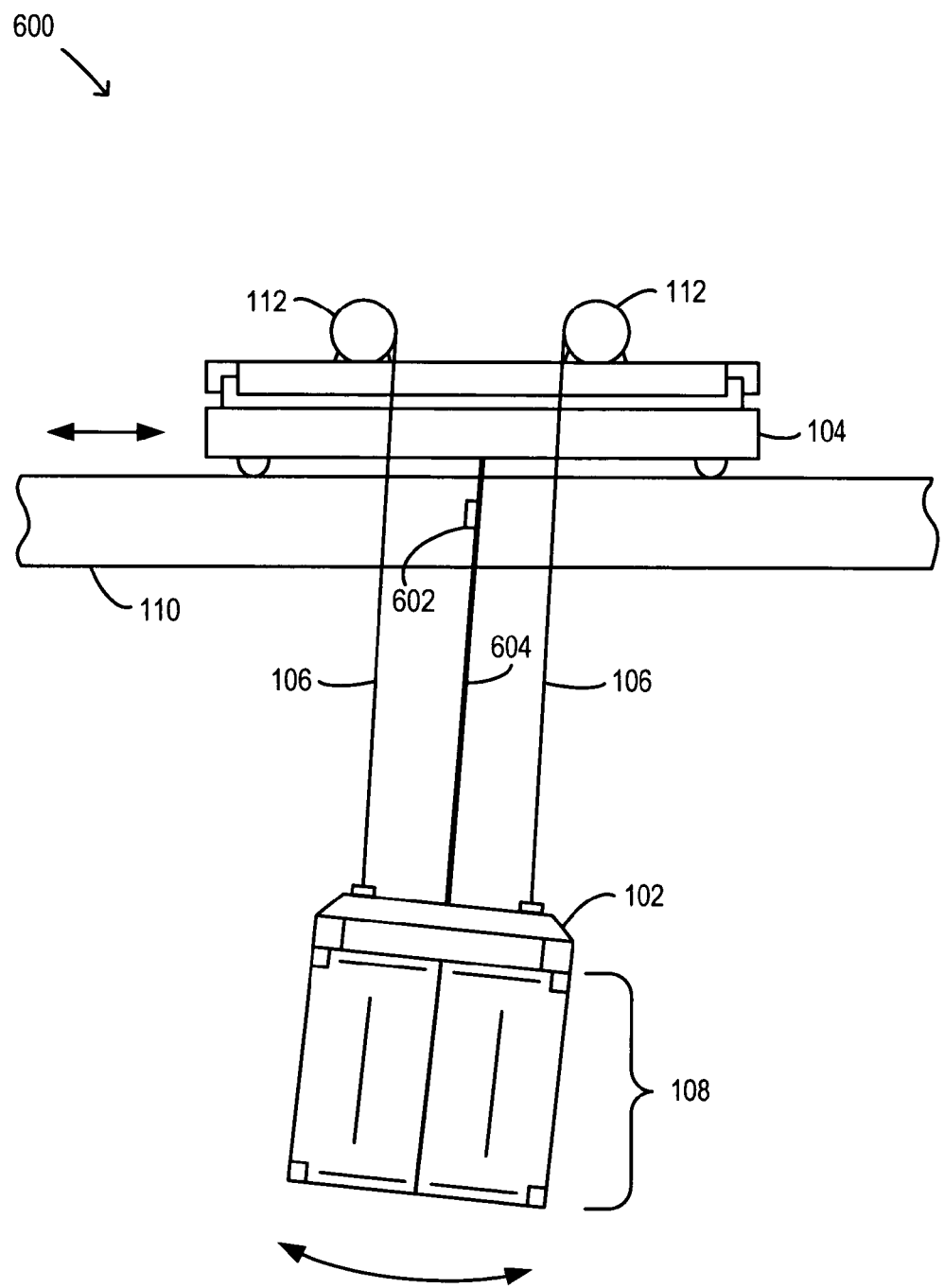
FIG. 6 is a block diagram of a system for transporting loads according to some embodiments.

Turning now to FIG. 6, a block diagram of a system 600 for transporting a load according to some embodiments is shown. In some embodiments, the system components 102, 104, 106, 108, 110, 112 may be similar in configuration and/or functionality to those described above. In some embodiments fewer or more components than shown may be included in system 600. According to some embodiments, the system 600 may include a gyroscope 602 attached to a cable 604. The gyroscope 602 may be any type of gyroscopic and/or other angular measuring device known or available. In some embodiments the gyroscope 602 may be or include a MEMS device such as a MEMS gyroscope. The gyroscope 602 may, for example, measure the angle of the cable 604. In some embodiments where the cable 604 may extend vertically when the load is at rest, for example, the gyroscope 602 may measure the angle of deviation of the cable 604 from the vertical.

The cable 604 may, according to some embodiments, extend between a first point on the trolley 104 and a second point on the load spreader 102. The cable 604 may be, for example, a power cable that provides power to the load spreader 102. In some embodiments, the first point may be the point μ and/or the second point may be the point δ. Coupling the cable to the two points μ and δ, for example, would facilitate calculations since each point is a geometric reference point which may be used in determining sway. In embodiments where the cable connects points μ and δ, the angle measured by the gyroscope 602 would be the angle φ. In some embodiments, other angles such as angle $\phi_2$ may be measured, depending upon the orientation of the cable 604.

Figure 7:
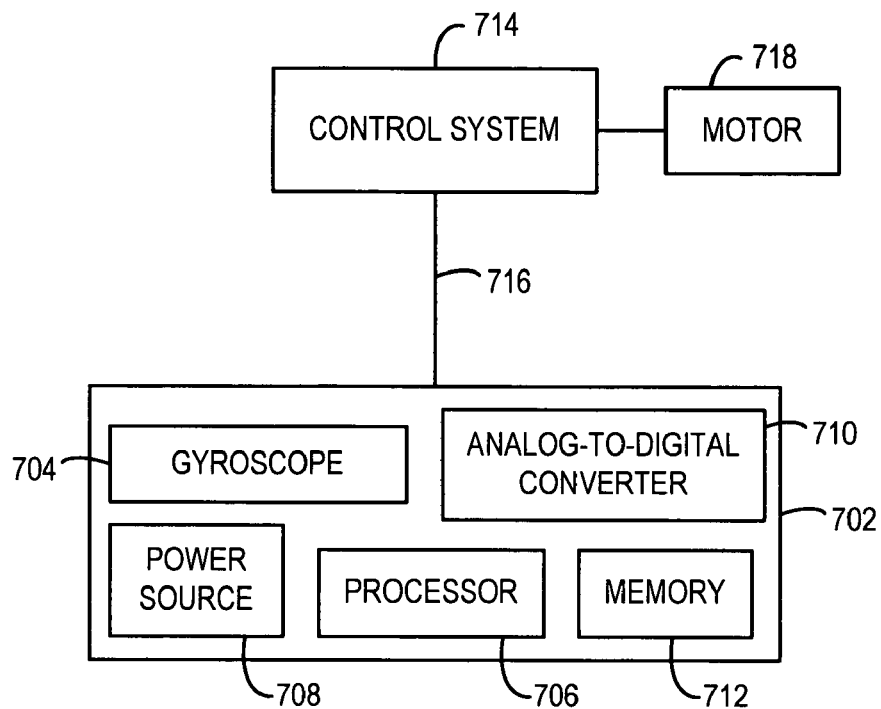
FIG. 7 is a flowchart of a method according to some embodiments.

The angular measurement from the gyroscope 602 may, according to some embodiments, be utilized to calculate and/or otherwise determine the sway of the load 108. For example, turning now to FIG. 7, a block diagram of a system 700 according to some embodiments is shown. The system 700 may, for example, be utilized in conjunction with and/or as part of the load transportation system 600 to measure and/or control the sway of loads. In some embodiments, system 700 may include fewer or more components than are shown in FIG. 7.

According to some embodiments, system 700 may include a device 702. In some embodiments, the device 702 may be or include a MEMS device such as a MEMS gyroscope. As shown in FIG. 7, the MEMS device 702 may include a gyroscope 704 (or other sensor), a processor 706, a power source 708, an analog-to-digital converter 710, and a memory device 712. In some embodiments, the processor 706, power source 708, analog-to-digital converter 710, and memory device 712 may be similar in configuration and/or functionality to the processor 312, 314, power sources 322, 324, analog-to-digital converters 326, 328, and memory devices 330, 332 described in conjunction with system 300 herein.

In some embodiments, the gyroscope 704 may be or include a MEMS device. For example, the gyroscope 704 may be or include a MEMS gyroscope. The MEMS gyroscope 704 may, according to some embodiments, measure and/or otherwise determine an angle. For example, the MEMS gyroscope 704 may be attached to a cable such as cable 604, and may measure the angle φ. According to some embodiments, the measurement may be transmitted via a signal to the processor 706. The processor 706 may then utilize the signal and/or measurement, for example, to determine a sway of a suspended load (such as load 108).

According to some embodiments, the processor 706 may generate a sway signal and may transmit the signal to a control system 714. The control system 714 may, for example, be similar to the control system 316 of system 300. The control system 714 may be operable to control the movement of a trolley along one or more axes or paths. For example, the control system 714 may operate and/or otherwise be in communication with a motor 718 for moving the trolley along a rail or path. In some embodiments, the control system 714 may send control signals to the motor 718 to control and/or correct the sway determined by the processor 706. As described herein, this process may be repeated with such frequency that the control system 714 may manage the movement of the trolley to reduce, control, correct, and/or otherwise manage the sway of a suspended load.

The power source 708 may provide power in any known or available manner to any of the gyroscope 704, the processor 706, and/or the analog-to-digital converter 710. The analog-to-digital converter 710 may be used to convert analog signals received from the gyroscope 704 into digital signals. In some embodiments, digital signals are received and/or utilized by the processor 706. The memory device 712 may be any type of storage media that is or becomes known and may store various forms of information including analog and/or digital signals, program code for use by the processor 706, and/or lookup or database tables for facilitating the determination of load sway.

Figure 8:
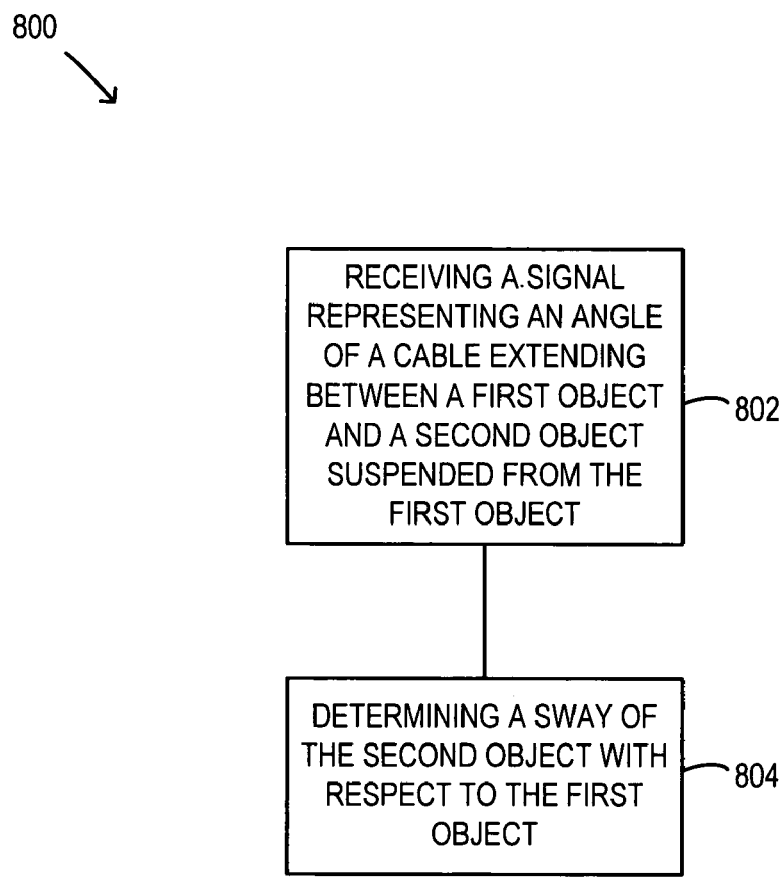
FIG. 8 is a block diagram of a system according to some embodiments.

As an example, referring now to FIG. 8, a flow diagram of a method 800 for determining the sway of a load in accordance with some embodiments is shown. The method 800 may be associated with and/or performed by, for example, the systems 600 and/or 700 (or one or more of the system components) described in conjunction with any of FIG. 6 and/or FIG. 7 herein.

In some embodiments (such as shown in FIG. 8), the method 800 may begin by receiving a signal representing an angle of a cable extending between a first object and second object suspended from the first object, at 802. The cable may be a cable 604, and/or the objects may be a trolley 104 and a load spreader 102 respectively, such as those described in conjunction with system 600 herein, for example. In some embodiments a MEMS gyroscope and/or other angle measuring device may generate a signal representing the angle of the cable. The signal may be received, for example, by a processor such as processor 706.

In some embodiments the method 800 may continue at 804 by determining a sway of the second object with respect to the first object. For example, a processor and/or other device may utilize the signal and/or other information to calculate the sway of a load. In some embodiments where the cable may be attached between points μ and δ, for example, the signal received from the MEMS gyroscope may relate to the angle φ. Based on the geometry of the suspended load system (such as shown in FIG. 4, for example) the processor may calculate a sway of the load such as the relative displacement Δx. In some embodiments, the relationship between the displacement Δx and the measured angle (such as angle φ) may be pre-determined and the processor may access a lookup and/or database table to determine the appropriate sway (Δx) based upon the angle measurement (such as angle φ) received from the MEMS gyroscope.

According to some embodiments, the process of determining sway may be continued further by sending signals to a control system (such as control system 714) to affect the motion of the trolley in order to reduce the sway of the load. The entire process (or any portion thereof) may also be repeated at intervals, perhaps even as often as one hundred or more times per second. The functionality of the control system and repeated sway determination and/or correction procedures are described previously herein with respect to method 500 and are applicable to the present method 800 as well.

The several embodiments described herein are solely for the purpose of illustration. Persons skilled in the art will recognize from this description that other embodiments may be practiced with modifications and alterations limited only by the claims.

What is claimed is:

1. A system, comprising:
   a first device, coupled to measure an acceleration of a first object suspended from a second object, the first device generating a first signal representing the acceleration of the first object;
   a second device, coupled to measure an acceleration of the second object, the second device generating a second signal representing the acceleration of the second object; and
   a processor in communication with the first and second devices, the processor operable to determine a sway of the first object with respect to the second object based at least in part on the first and second signals, the sway representing a relative displacement of the first object with respect to the second object.

2. The system of claim 1, wherein the processor generates a sway signal representing the sway of the first object with respect to the second object.

3. The system of claim 2, further comprising:
   a control system receiving the sway signal and causing the second object to move along an axis, the control system responsive to the sway signal.

4. The system of claim 3, wherein the control system comprises:
   a motor operable to move the second object along the axis; and
   a control processor to receive the sway signal and to generate a control signal to compensate for the sway.

5. The system of claim 4, wherein the motor receives the control signal and moves the second object along the axis to compensate for the sway.

6. The system of claim 4, wherein a new sway signal is received by the control system and a new control signal is generated by the control processor to compensate for the sway.

7. The system of claim 3, wherein the first object includes a load spreader and a load carried by the load spreader, and the second object is a trolley.

8. The system of claim 1, wherein the sway represents a distance along the axis between a center of gravity of the first object and a midpoint of the second object.

9. The system of claim 1, wherein the first and second devices are micro-electro-mechanical system accelerometers.

10. The system of claim 1, wherein the first device includes:
    a micro-electro-mechanical system accelerometer to generate an analog signal;
    a power source to supply power to the micro-electro-mechanical system accelerometer;
    a memory device to store the analog signal; and
    an analog-to-digital converter to receive the analog signal and covert the analog signal to produce the first signal.

11. The system of claim 1, wherein the second device includes:
    a micro-electro-mechanical system accelerometer to generate an analog signal;
    a power source to supply power to the micro-electro-mechanical system accelerometer;
    a memory device to store the analog signal; and
    an analog-to-digital converter to receive the analog signal and covert the analog signal to produce the second signal.

12. The system of claim 11, wherein the second device further includes the processor.

13. The system of claim 1, further comprising:
    a communication link connecting the first and second devices.

14. The system of claim 1, wherein the first device is further coupled to measure at least one of a yaw, a pitch, and a roll associated with the first object.

15. The system of claim 1, wherein the acceleration of the first object is measured along three axes.

16. A computer-readable medium having instructions thereon, wherein said instructions, when executed by a processor, cause the processor to:
    receive a first signal representing an acceleration of a first object from a first device coupled to the first object;
    receive a second signal representing an acceleration of a second object from a second device coupled to a second object, the second object suspended from the first object; and
    determine, based at least in part on the first and second signals, a sway of the second object with respect to the first object, the sway representing a relative displacement of the second object with respect to the first object.

17. The computer-readable medium of claim 16, further comprising instructions causing the processor to:
    generate a sway signal representing the sway of the second object with respect to the first object; and
    transmit the sway signal to a control system that is operable to control the motion of the first object along an axis.

18. The computer-readable medium of claim 17, wherein the control system is responsive to the sway signal to adjust the movement of the first object.

* * * * *